United States Patent
Kim

[19]

[11] Patent Number: 5,861,700
[45] Date of Patent: Jan. 19, 1999

[54] ROTOR FOR AN INDUCTION MOTOR

[75] Inventor: Ki-Bong Kim, Suwon-City, Rep. of Korea

[73] Assignee: Samsung Electronics Co., Ltd., Suwon-City, Rep. of Korea

[21] Appl. No.: 819,960

[22] Filed: Mar. 18, 1997

[30] Foreign Application Priority Data

Apr. 30, 1996 [KR] Rep. of Korea .................. 96-13682

[51] Int. Cl.⁶ ........................... H02K 1/32; H02K 19/00
[52] U.S. Cl. ................ 310/261; 310/61; 310/216; 310/264
[58] Field of Search ........................... 310/261, 264, 310/269, 166, 168, 262, 265, 61, 192, 216, 217

[56] References Cited

U.S. PATENT DOCUMENTS

| | | | |
|---|---|---|---|
| 2,913,607 | 11/1959 | Douglas et al. | 310/168 |
| 3,210,584 | 10/1965 | Jorgensen et al. | 310/261 |
| 3,659,129 | 4/1972 | Pettersen | 310/261 |
| 4,641,051 | 2/1987 | Auinger | 310/261 |
| 4,748,360 | 5/1988 | Kawada et al. | 310/156 |
| 5,338,996 | 8/1994 | Yamamoto | 310/217 |

FOREIGN PATENT DOCUMENTS

5-344670  12/1993  Japan .................. 310/261

*Primary Examiner*—Thomas M. Dougherty
*Assistant Examiner*—B. Mullins
*Attorney, Agent, or Firm*—Burns, Doane, Swecker & Mathis, L.L.P.

[57] ABSTRACT

A rotor for an induction motor includes a core having a central hole extending axially therethrough for receiving a shaft. A plurality of large spaces are formed in the core radially outside of the center hole. The spaces are filled with a non-ferrous metal, and blowholes extend through the non-ferrous metal for conducting cooling air through the core.

4 Claims, 6 Drawing Sheets

ROTOR FOR AN INDUCTION MOTOR

BACKGROUND OF THE INVENTION

1. Field of the Invention

The present invention relates to a rotor for an induction motor and, more particularly to the rotor that reduces loss of the magnetomotive force of the induction motor for thus improving a start-up efficiency of the induction motor, and that is reduced in weight thereof for greatly reducing the manufacturing cost therefor.

2. Description of the Prior Art

Figure 1:
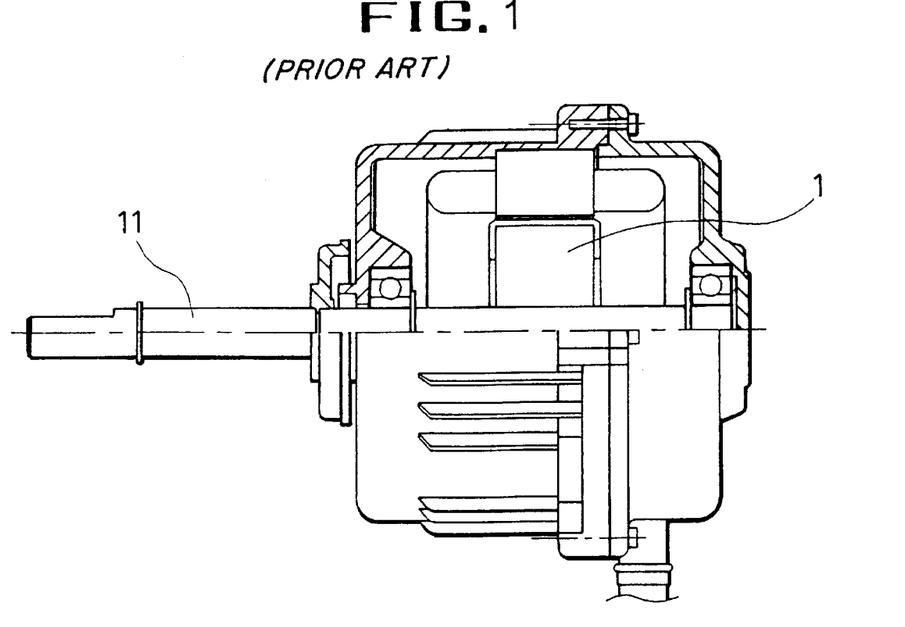
FIG. 1 is a fragmentary sectional view of an induction motor.

In general, as shown in FIG. 1, an induction motor has a core formed of a plurality of stacked circular rotor cores, each being made of a Si-steel plate, and a stator having a primary winding from which a magnetic field is generated, wherein the rotor is positioned within an effective range of the generated magnetic field. Thus, the location of the rotor as a secondary conductor causes the magnetic flux to be formed over the bulk of the rotor due to a circular shape of the rotor cores.

Figure 14A:
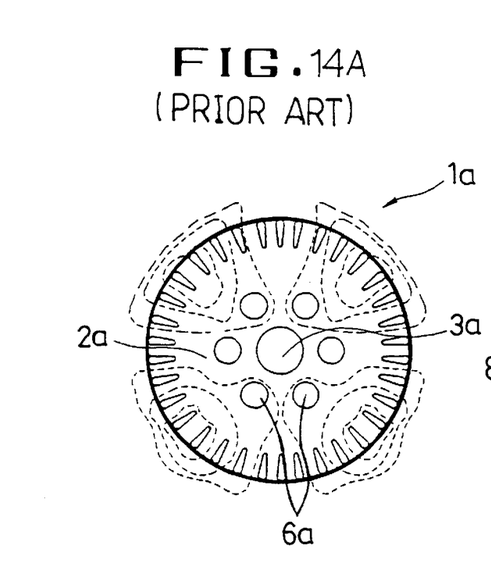
FIG. 14A shows a magnetic flux path of one example according to the prior art.

A rotor 1a used in a conventional induction motor as shown in FIG. 14A is configured such that in the central portion of a plurality of stacked rotor cores 2a, is formed a shaft inserting hole 3a for inserting a motor shaft 11 (FIG. 1), and an outer portion of the shaft inserting hole 3a is provided with many blowholes 6a for an air flow.

Figure 14B:
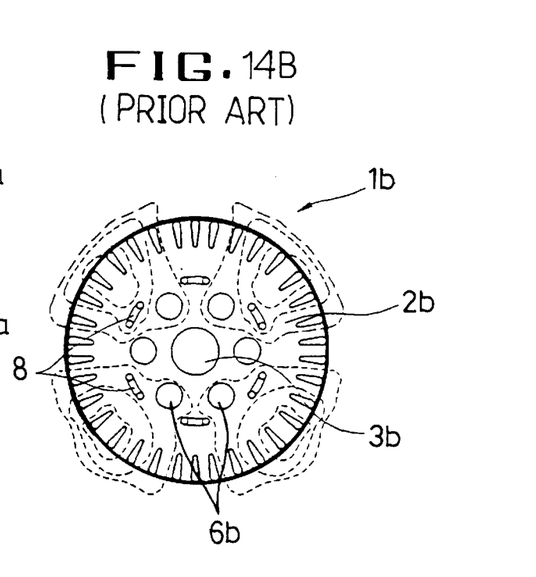
FIG. 14B shows a magnetic flux path of another example according to the prior art.

Another induction motor conventionally provided includes, as shown in FIG. 14B, a plurality of stacked rotor cores 2b having a shaft inserting hole 3b at a central portion thereof prepared for inserting a motor shaft, and a plurality of blowholes 6b at an outer portion thereof for an air flow. Furthermore self-stacking recesses 8 used for automatically stacking rotor cores 2a are formed outside of the blowholes 6b of the rotor core 2b.

However, for each of rotors 1a, 1b in two examples stated above, the magnetic flux is wholly distributed throughout the circular rotor cores 2a, 2b, resulting in the production of relatively longer paths among the magnetic flux paths. The more long paths for the magnetic flux are, the higher increased magnetic reluctances are generated.

Accordingly, there is a problem in that higher magnetic reluctance acts as a cause of the considerable loss of magnetomotive force which consequently reduces a start-up efficiency of the motor.

Furthermore, there is another problem in that heavier rotors 1a and 1b result in increased no-load torque and inertia force, caused by their heavy weight, and lead to an increase in the manufacturing cost.

SUMMARY OF THE INVENTION

Therefore, it is an object of the present invention to provide a rotor for an induction motor which reduces loss of the magnetomotive force of the induction motor to thereby improve a start-up efficiency of the induction motor.

Another object of the present invention is to provide a lighter-weight rotor for an induction motor for greatly reducing no-load torque and inertia force, and a manufacturing cost therefor.

The above objects are accomplished by a rotor for an induction motor having the rotor and a stator to generate the rotating force, characterized in that a rotor core is provided with a plurality of spaces, each being isolated from each other by core legs disposed in relation to a centered shaft inserting hole which is located in a central portion of the rotor core.

Further, the isolating plate in the spaces may be provided with a blowhole, or the spaces may be filled with nonferrous metal, in order to assist in cooling the rotor core.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

The preferred embodiments according to the present invention will now be described in detail in accordance with the accompanying drawings.

Figure 2:
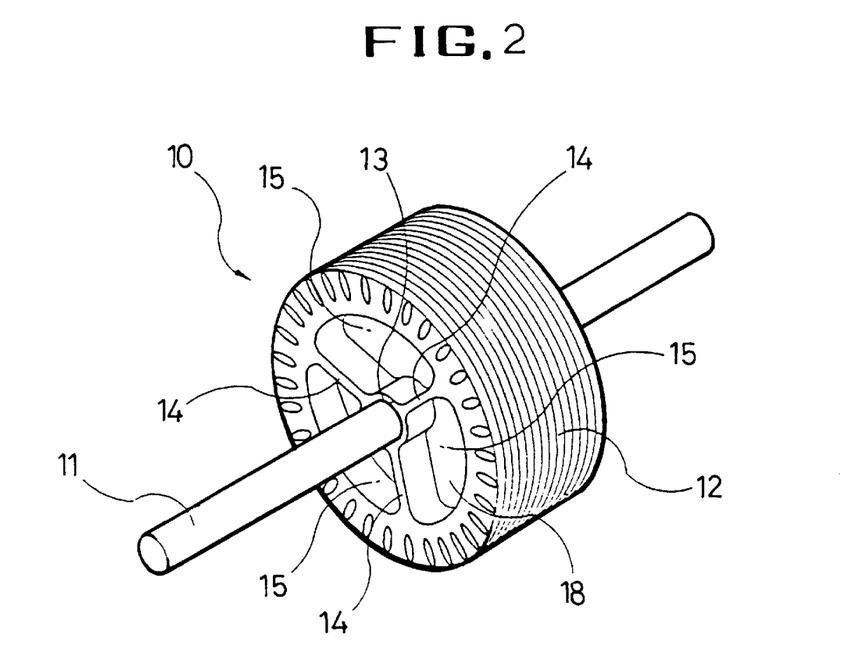
FIG. 2 is a perspective view of a rotor according to a first embodiment of the present invention.
Figure 3A:
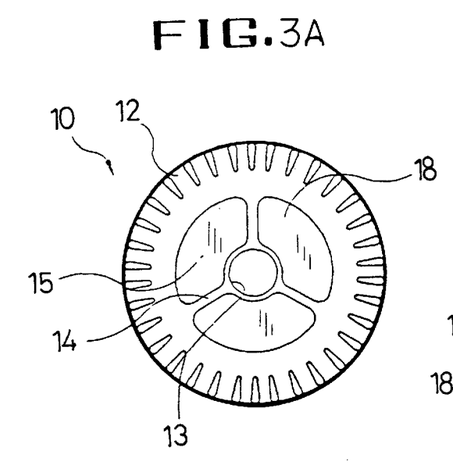
FIGS. 3A and 3B are side and fragmentary sectional views of the rotor according to the first embodiment.
Figure 4A:
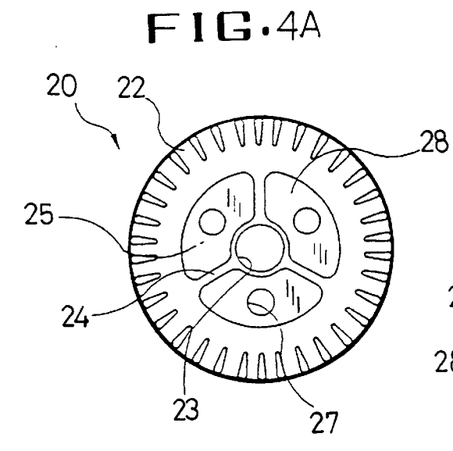
FIG. 4A is a side view of the rotor according to a second embodiment and FIG. 4B is a fragmentary sectional view of the rotor according to the second embodiment.
Figure 4B:
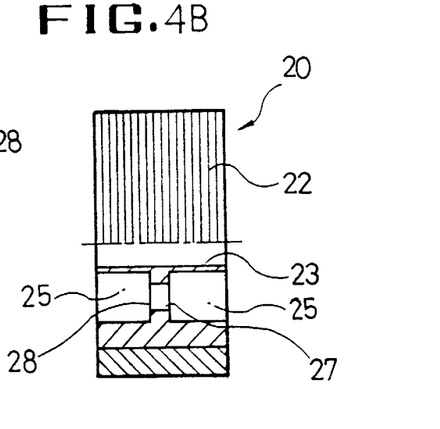

FIG. 2 is a perspective view of a rotor according to a first embodiment of the present invention, FIGS. 3A and 4B are side and fragmentary sectional views of the rotor according to the first embodiment, respectively.

Figure 3B:
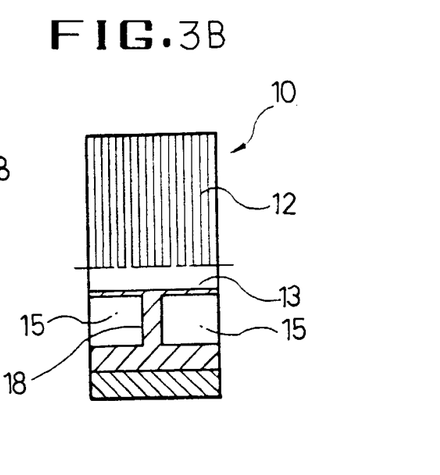

FIGS. 2 to 3 show that the rotor 10 according to the first embodiment of the present invention includes a rotor core 12, a shaft inserting hole 13 located in a central portion of the rotor core 12 through which a shaft 11 of a motor is coupled, core legs 14 disposed to radially extend from the centered shaft inserting hole 13, and spaces 15 formed between the core legs 13, wherein the plurality of core legs 14 are separately provided in both front and rear axial sides of the rotor core 12, respectively, and thus the spaces 15 are symmetrically placed opposite to one another in both sides of the rotor core 12, and wherein the spaces in one side of the rotor core 12 are separated from the spaces in another side of the rotor core 12 by an isolating plate 18.

FIG. 4A is a side view of the rotor in accordance with a second embodiment of the present invention, where the rotor 20 of the second embodiment includes a rotor core 22, a shaft inserting hole 23 located in a central portion of a rotor core 22 through which a shaft of the motor is coupled, core legs 24 disposed to radially extend from the centered shaft inserting hole 23, and spaces 25 formed between the core legs 13, wherein the core legs 24 are separately provided in both front and rear sides of the rotor core 22, respectively, and thus the spaces 25 are symmetrically placed opposite to one another in both sides, and wherein the spaces 25 in both sides are separated by an isolating plate 28 like in the first embodiment. Further, the isolating plate 28 is provided with three blowholes 27, each being assigned for one space, so as to communicate between the front and rear spaces, respectively, formed in both sides of the rotor core 22, so that the air can flow through each blowhole 27.

Figure 5:
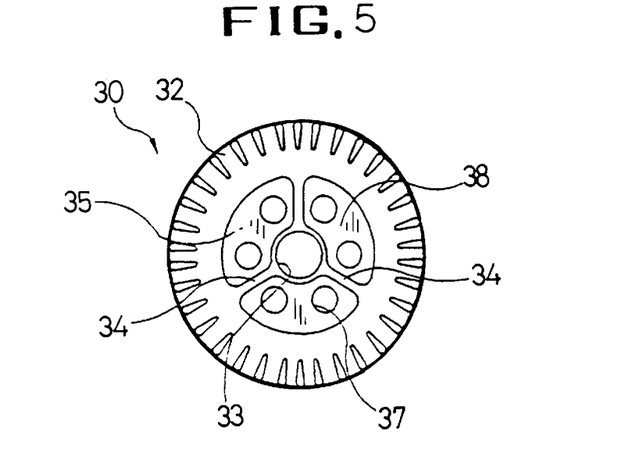
FIG. 5 is a side view of a rotor according to a third embodiment of the present invention.

Furthermore, in a third embodiment of the present invention as shown in FIG. 5, an isolating plate 38 of the same functioning as previous embodiments is provided with two blowholes 37.

Figures 6A, 6B:
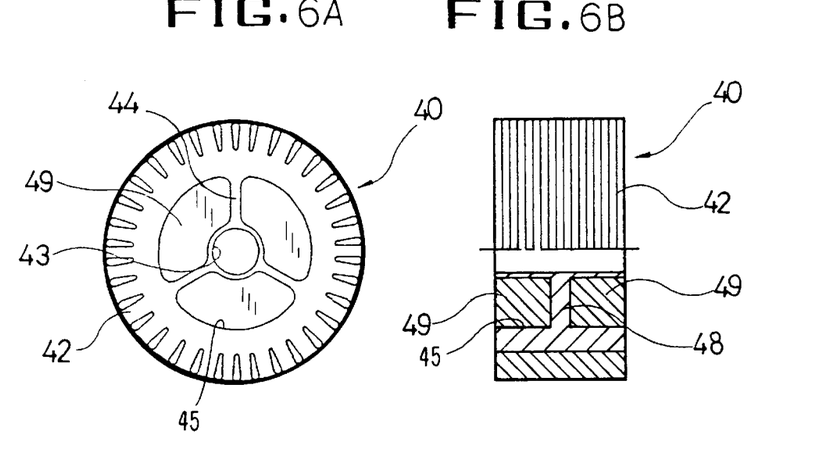
FIGS. 6A and 6B are side and fragmentary sectional views, respectively, of a fourth rotor embodiment.

FIGS. 6A and 6B are side and fragmentary sectional views of the rotor in accordance with a fourth embodiment of the present invention, respectively. The rotor 40 of the fourth embodiment includes a rotor core 42, a shaft inserting hole 43 located in a central portion of the rotor core 42 through which a shaft of a motor is coupled, core legs 44 disposed to radially extend from the centered shaft inserting hole 43, and spaces 45 formed between the core legs 43 and filled with nonferrous metal 49 such as aluminum, etc. which acts to prevent a loss of the magnetomotive force, as well as improve the cooling effect for the rotor core 42.

Figures 7A, 7B:
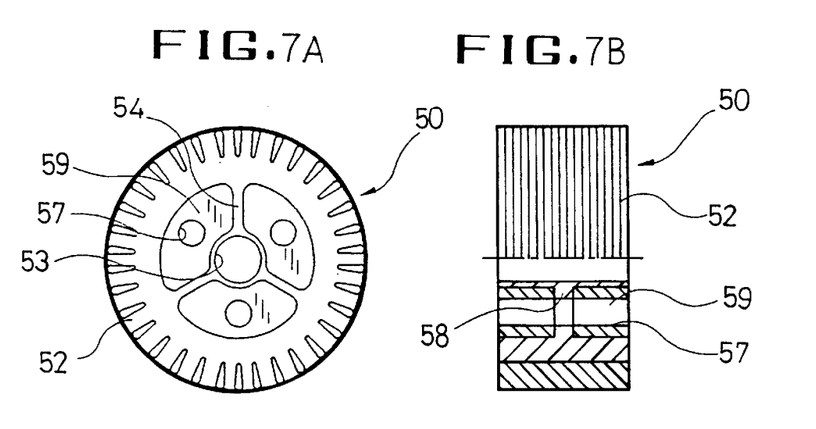
FIGS. 7A and 7B are side and fragmentary sectional views, respectively, of a fifth rotor embodiment.

FIGS. 7A and 7B are side and fragmentary sectional views according to a fifth embodiment of the invention. The rotor 50 of the fifth embodiment includes a rotor core 52, a shaft inserting hole 53 located in a central portion of the rotor core 52 through which a shaft of a motor is coupled, core legs 54 disposed to radially extend from the centered shaft inserting hole 53, and spaces formed between the core legs 53 and filled with nonferrous metal 59 such as aluminum, etc. Furthermore, the nonferrous metal 59 is provided with a blowhole 57 formed therethrough, resulting in further improvement of the cooling effect for the rotor core 52.

Figures 8A, 8B:
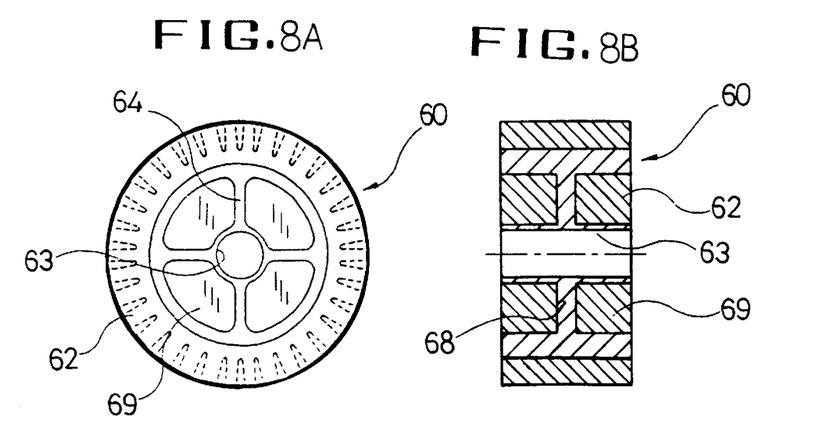
FIGS. 8A and 8B are side and cross sectional views, respectively, of a sixth rotor embodiment.

FIGS. 8A and 8B are side view and fragmentary sectional views according to a sixth embodiment of the invention. The rotor 60 of the sixth embodiment includes a rotor core 62, a shaft inserting hole 63 located in a central portion of the rotor core 62 through which a shaft of a motor is coupled, core legs 64 disposed to radially extend from the centered shaft inserting hole 43, and four spaces formed between the core legs 64 and filled with nonferrous metal 69 such as aluminum, etc.

Figure 9A:
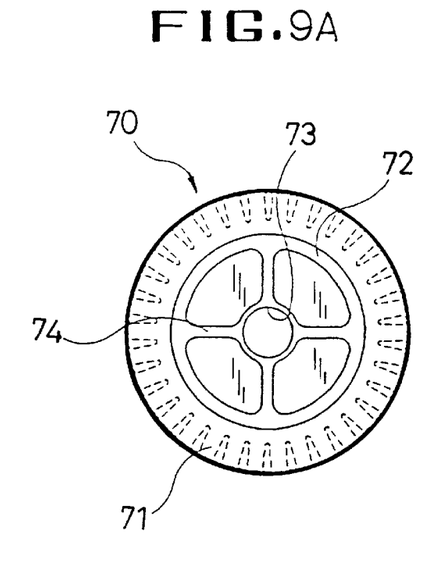
FIGS. 9A and 9B are side and cross sectional views, respectively of a seventh rotor embodiment.
Figure 9B:
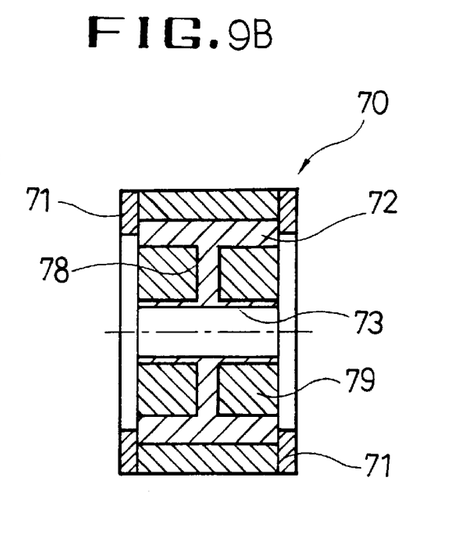

FIGS. 9A and 9B are side and fragmentary sectional views according to a seventh embodiment of the invention. The rotor 70 of the seventh embodiment includes a rotor core 72, a shaft inserting hole 73 located in a central portion of the rotor core 72 and through which a shaft of a motor is coupled, core legs 74 disposed to radially extend from the centered shaft inserting hole 73, and four spaces formed between the core legs 74 and filled with nonferrous metal 79 such as aluminum, etc. Further, the rotor core 72 has at both ends thereof end rings 71 provided.

Figure 10A:
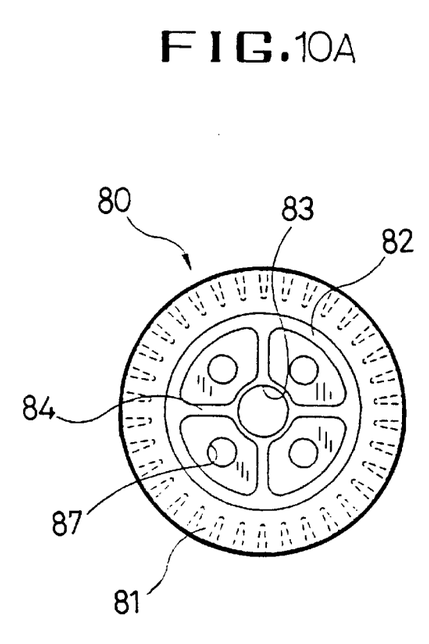
FIGS. 10A and 10B are side and cross sectional views, respectively, of an eighth rotor embodiment.
Figure 10B:
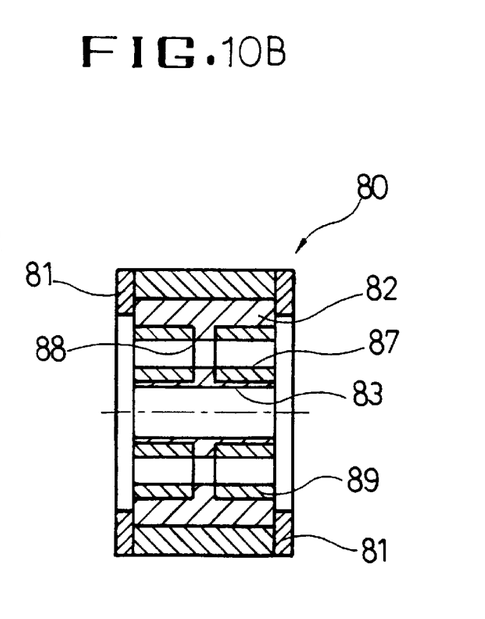

FIGS. 10A and 10B are side and fragmentary sectional views according to an eighth embodiment of the invention. The rotor 80 of the eighth embodiment includes a rotor core 82, a shaft inserting hole 83 located in a central portion of the rotor core 82 through which a shaft of a motor is coupled, core legs 84 disposed to radially extend from the centered shaft inserting hole 83, and four spaces formed between the core legs 84 and filled with nonferrous metal 89 such as aluminum, etc. Further, there is provided a blowhole 87 which is through the nonferrous metal 89.

Figure 11A:
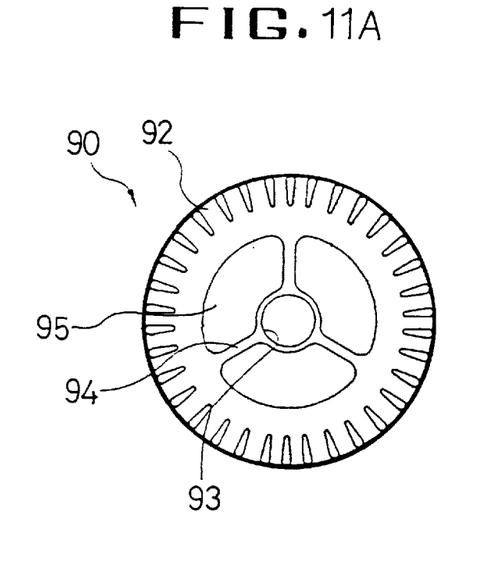
FIGS. 11A and 11B are side and fragmentary sectional views, respectively, of a sixth rotor embodiment.
Figure 11B:
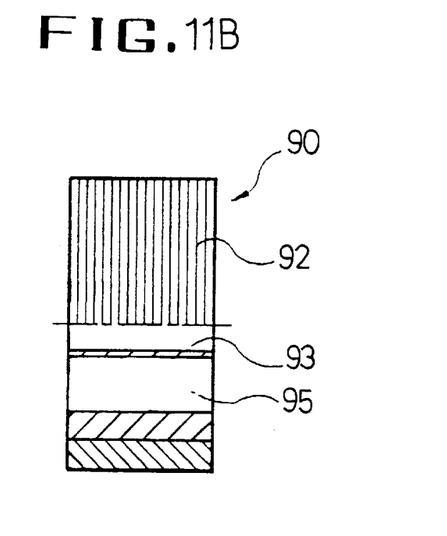

FIGS. 11A and 11B are side and fragmentary sectional views according to a ninth embodiment of the invention. The rotor 90 of the ninth embodiment includes a rotor core 92, a shaft inserting hole 93 located in a central portion of the rotor core 92 through which a shaft of a motor is coupled, core legs 94 disposed to radially extend from the centered shaft inserting hole 93, and a through hole 95 formed between the core legs 74.

Figure 12A:
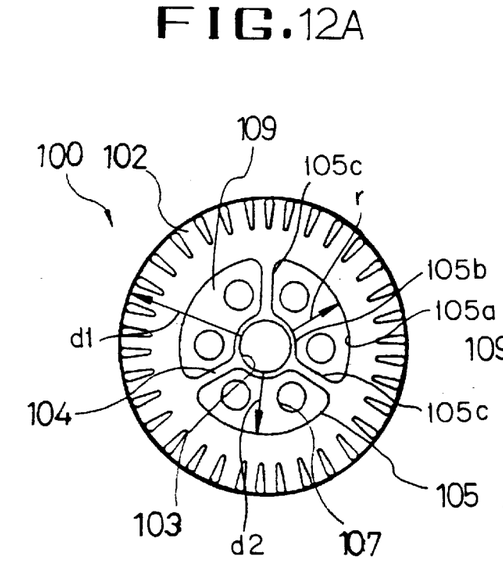
FIGS. 12A and 12B are side and fragmentary sectional views, respectively, of a tenth rotor embodiment.
Figure 12B:
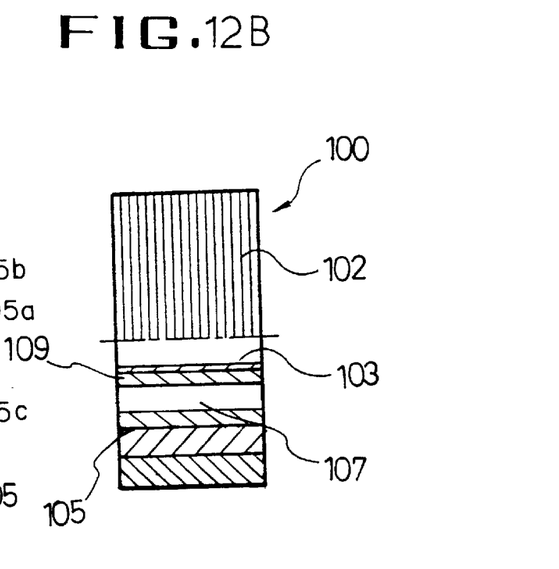

FIGS. 12A and 12B are side and fragmentary sectional views according to a tenth embodiment of the invention. The rotor 100 of the tenth embodiment includes a rotor core 102, a shaft inserting hole 103 located in a central portion of a rotor core 102 through which a shaft of a motor is coupled, core legs 104 disposed to radially extend from the centered shaft inserting hole 103, and through holes 105 formed between the core legs 104. Each through hole 105 is filled with a nonferrous metal 109 having blowholes 107 formed therethrough.

The detailed operation of such configured rotors will be described below with reference to FIGS. 13A, 13B.

Figures 13A, 13B:
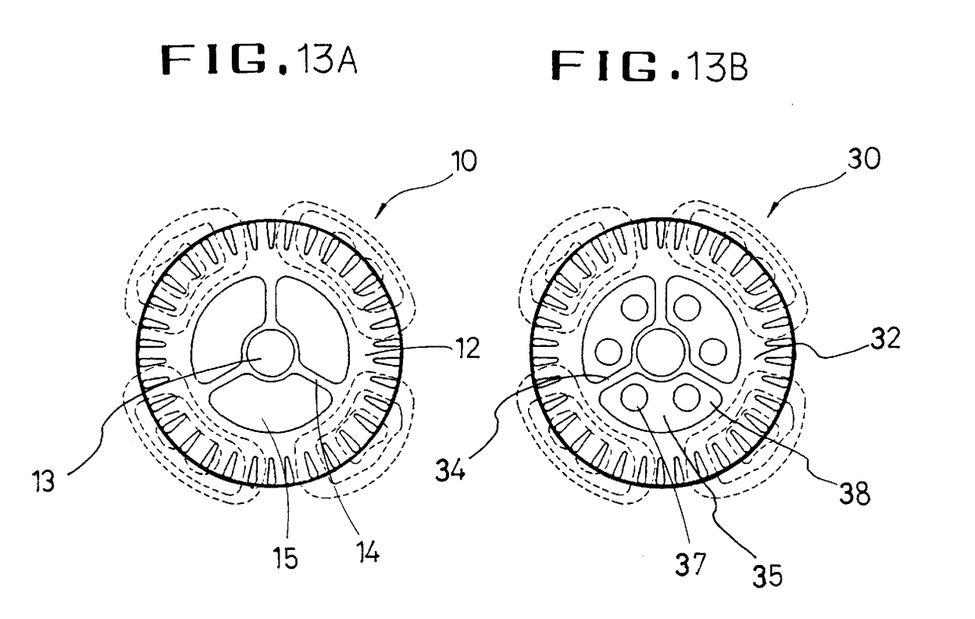
FIGS. 13A and 13B show a magnetic flux path of the rotors illustrated in FIGS. 3A and 5A, respectively.

As shown in FIG. 13A, since a plurality of spaces 15 are formed between the core legs 13 disposed to radially extend from the inserting hole 13 located in the central portion of the rotor core 12 for an induction motor, it results in shorter distances through which the magnetic fluxes pass, as illustrated in the dotted lines in drawing, which reduces loss of the magnetomotive force so that the start-up efficiency of the motor can be improved.

Further, the spaces 15 allow the weight of the rotor 10 to be greatly reduced, resulting in the reduction of no-load torque and inertia force, as well as the manufacturing cost accordingly.

Still further, as shown in FIG. 13B, since a plurality of blowholes 37 for an air flow are provided with an isolating plate 38 defining the spaces 35 formed in the rotor core 32 of the rotor 30, and are filled with nonferrous metal preferably made of, for example, aluminum, etc., as a thermal radiant element which acts to absorb the heat emanated from the acted rotor core 22 and thereby to conduct the effective thermal radiation.

Now, more detailed explanation concerning the principle of the present invention will be described below.

When the magnetic flux passes through the rotor core 22 of the rotor 20, loss of the magnetomotive force due to the magnetic reluctance may occur, and therefore reducing the magnetic reluctance is reduces the loss of the magenetomotive force and to improve the efficiency of the motor.

Furthermore, that will increase the intensity of magnetic field and inductance so as to further improve the motor efficiency.

The factors of magnetic reluctance, intensity of magnetic field, and inductance, relating to the above-mentioned motor efficiency, may be given as in the following equations.

1. The magnetic reluctance R is given as follows:

$$R = l/(F_0 \cdot F \cdot A) \tag{1}$$

where $F_0$ denotes permeability of an air and vacuum, F denotes nonpermeability of an iron plate, l denotes a length of magnetic path, and A denotes a sectional area for magnetic path, respectively.

It can be seen from the above equation that the magnetic reluctance is proportional to the length of the magnetic path, and therefore the length of the magnetic path should be reduced so as to result in the reducing of the magnetic reluctance.

2. Intensity H(Oersted) of the magnetic field for an iron plate is given as follows:

$$H = 0.497 NI/l \text{(Oersted)} \tag{2}$$

where N denotes the number of windings, I denotes input current value, and l denotes the length of magnetic path, respectively.

Because the intensity of magnetic field is proportional to the magnetic path, the length of the magnetic path has to be reduced so as to increase the intensity of the magnetic field.

3. Inductance of the magnetic field L(Henry) is given as follows:

$$L = (3.192 \times 10^{-8} F_0 \cdot F \cdot N^2 A_0 K_0)/l \text{(Henry)} \tag{3}$$

where $F_0$ denotes permeability of an air and vacuum, F denotes nonpermeability of an iron plate, N denotes the number of windings, $A_0$ denotes a sectional area for the magnetic path, $K_0$ denotes a stack density coefficient for the iron plate, and l denotes a length of the magnetic path, respectively.

Because the inductance is proportional to the length of the magnetic path, the length of the magnetic path has to be reduced so as to increase the intensity of the magnetic field.

As seen from the above equations (1) to (3), what is important is to reduce the length of the magnetic path for reducing the magnetic reluctance of the rotor, and for increasing the intensity of the magnetic field and the inductance.

It is noted that, as shown in FIGS. 13A and 13B, the rotor of the present invention has the rotor core 12, 32 provided with the spaces 15, 35 therein, so the length of the magnetic path is much shorter over the conventional rotors 1a, 1b as shown in FIGS. 14A and 14B.

It is further noted that the formation of the spaces 15, 25 is made in consideration of the sectional area for the magnetic path.

From the above equation (1), we can notice that the sectional area for the magnetic path should be taken such that an appropriate level of magnetic density is provided, because the magnetic reluctance is inversely proportional to that area.

More detailed, an iron loss $W_i$ in relation to the present magnetic path can be obtained from the following equation (4).

$$W_i = k_h @ Bm^{1.6} @ f + k_e @ Bm^2 @ f^2 \tag{4}$$

where $k_h$ denotes hysteresis constant, $k_e$ denotes eddy current constant, and f denotes frequency.

It is noted that the value of iron loss $W_i$ should be such that the magnetic flux density does not increase beyond the value required.

To this end, as seen from the sectional view of the rotor core, the distance from a lower section of the slot to an inner diameter is to be taken above a tooth width of a stator yoke, and further the magnetic density calculated in relation to that portion is not to be beyond minimum point of the nonpermeability in a critical portion in a B-H curve of Si-steel plate.

In other words, the sectional area for the magnetic path must be maintained in such a manner that the iron loss calculated from the above equation (4) is less than that of the conventional one.

Also, the space formed in the rotor core and filled with aluminum improves the heat radiation effect as compared with empty spaces, because the aluminum acts to absorb the heat generated from the rotor core, thereby further improving the motor efficiency.

The experimental result of the induction motor manufactured under the principle of the present invention is shown in Table 1 below.

The preferred specimen used in obtaining such experimental results of Table 1 was of a single phase induction motor of 60 Hz and 220 V provided with the rotor having blowholes 57 configured as shown in FIG. 7A, of which an outer diameter is 107 mm, stack height 55 mm, the number of poles 4, input power 516 W, radius of region with which the aluminum filled 17.67 mm, and the diameter of the blowhole 5.88 mm, respectively.

For the comparison with the present invention, the employed prior art single induction motor having the rotor configured as shown in FIG. 14A has the same parameters as the specimen in FIG. 7A, but there are no the spaces or blowholes in the rotor of the conventional structure.

TABLE 1

| | prior art | | | invention | | | |
|---|---|---|---|---|---|---|---|
| Load | RPM | current (Am) | efficiency | RPM | current (Am) | efficiency | relative effect |
| 0.0 | 1712 | 1.20 | — | 1.20 | 1735 | 1.10 | 10.0 |
| 0.5 | 1656 | 1.20 | 6.27 | 1.20 | 1695 | 1.10 | 11.6 |
| 1.0 | 1618 | 1.22 | 12.06 | 1.22 | 1650 | 1.18 | 5.4 |
| 1.5 | 1527 | 1.40 | 14.87 | 1.40 | 1588 | 1.20 | 21.35 |
| 2.0 | 1340 | 1.45 | 16.80 | 1.45 | 1502 | 1.25 | 30.06 |
| 2.5 | — | — | — | — | 1392 | 1.40 | — | where the used units are as follows:
1. load: inch @ pounds;
2. efficiency: efficiency per unit(EPU) (n)=100×(load×RPM) /(voltage×current×60); and
3. relative effect 100×(EPU of the present invention−EPU of the prior art)/(EPU of the prior art)

From the above table 1, we can notice that the present invention has a 10–30% higher relative effect than in the prior art.

As described above, the present invention provides a rotor for an induction motor which reduces loss of the magnetomotive force of the induction motor and thus improves the start-up efficiency of the induction motor, and has lighter rotor for greatly reducing no-load torque and inertia force, as well as the manufacturing cost, consequently improving the product efficiency and reliability thereof.

What is claimed is:

1. A rotor adapted for use in an induction motor, the rotor comprising a core having a central hole extending axially therethrough and adapted to receive a shaft; a plurality of spaces formed in the core in circumferentially spaced relationship, each space filled with a non-ferrous metal; at least one blowhole extending through the non-ferrous metal of each of the spaces, whereby each blowhole is able to conduct cooling air through the core; each of the spaces including radially spaced outer and inner sides and a pair of circumferentially spaced sides; each of the circumferentially spaced sides interconnecting the outer and inner sides; the outer side having a longer circumferential dimension than the inner side; each of the spaces having a maximum radial dimension extending between the outer and inner sides thereof; the core defining a first distance extending radially from an outer edge of the central hole to an outer periphery of the core, and a second distance extending radially from the outer edge of the central hole to the outer side of each of the spaces; the second distance being about one-half of the first distance; the maximum radial dimension of each space being about one-half of the first distance.

2. The rotor according to claim 1 wherein each blowhole is spaced from the outer and inner sides and from the circumferentially spaced sides of the respective space.

3. The rotor according to claim 1 wherein each of the spaces is interrupted in the axial direction by an isolating plate; the blowholes extending through respective ones of the isolating plates.

4. The rotor according to claim 1 further including end rings mounted on opposite ends of the core.

* * * * *